June 21, 1938.  J. H. BLANKENBUEHLER  2,121,581

REVERSING SWITCH FOR DYNAMO-ELECTRIC MACHINES

Filed June 15, 1935  2 Sheets-Sheet 1

WITNESSES:
Fred C. Milhan
R R Lockwood

INVENTOR
John H. Blankenbuehler
BY
M Crawford
ATTORNEY

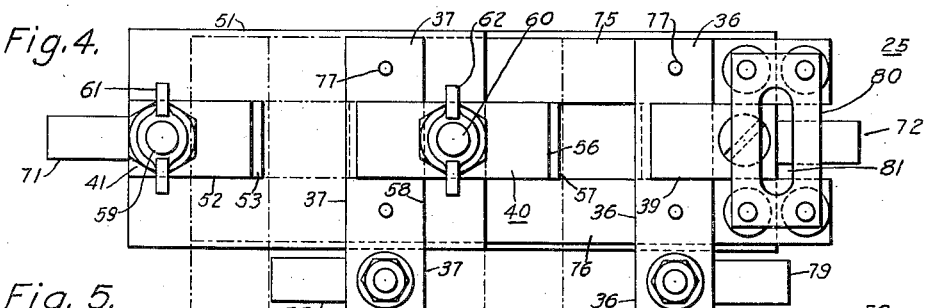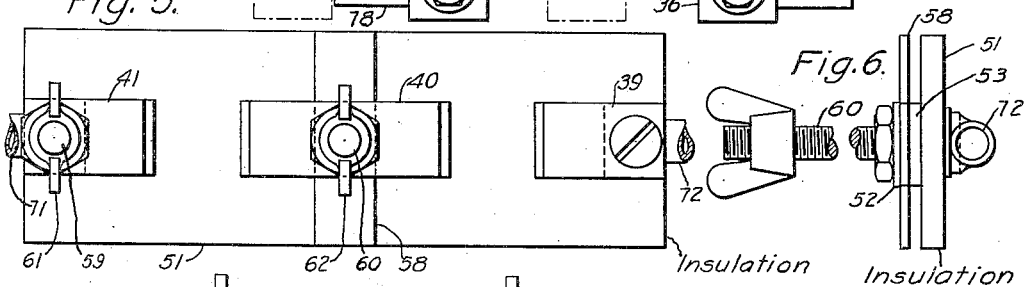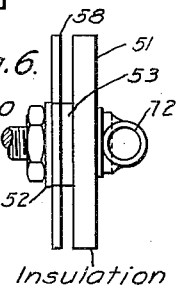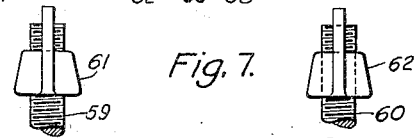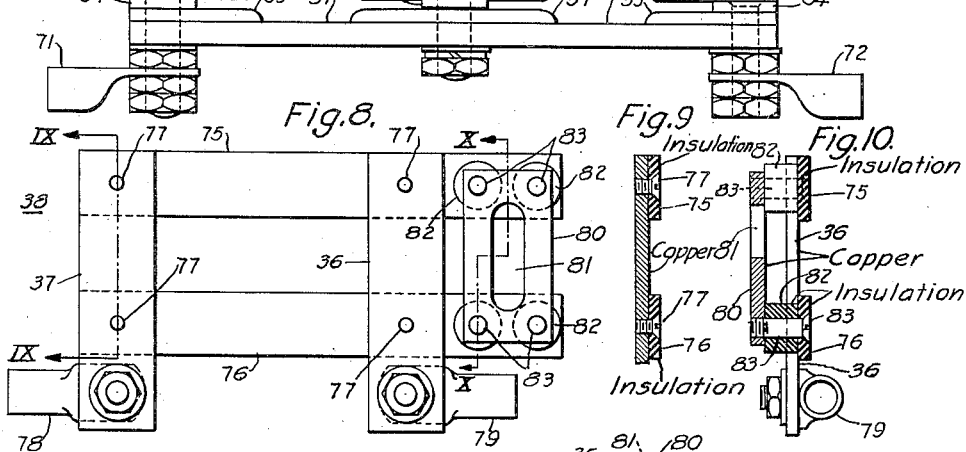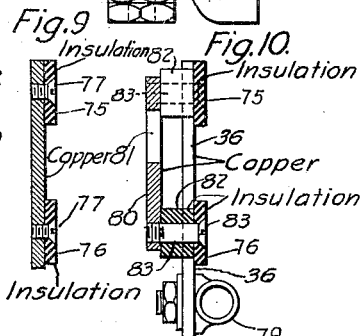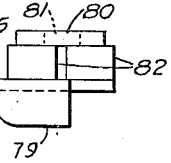

Patented June 21, 1938

2,121,581

UNITED STATES PATENT OFFICE 2,121,581

REVERSING SWITCH FOR DYNAMO-ELECTRIC MACHINES

John H. Blankenbuehler, Edgewood, Pa., assignor to Westinghouse Electric & Manufacturing Company, East Pittsburgh, Pa., a corporation of Pennsylvania Application June 15, 1935, Serial No. 26,872

8 Claims. (Cl. 171—252)

My invention relates, generally, to dynamo-electric machines and it has particular relation to load circuit reversing switches therefor.

In the construction of direct-current dynamo-electric machines, it is often desirable to provide for reversing the polarity of the output circuit. It is particularly desirable to provide for this reversal when the dynamo-electric machine is used as a generator to supply current for maintaining a welding arc. Under certain welding conditions it is preferable to apply one polarity to the welding electrode while under other conditions it is preferable to apply opposite polarity. In order to facilitate changing the polarity of the output circuit of the dynamo-electric machine, a reversing switch is provided for establishing the necessary connections.

Under normal operating conditions, the load circuit of the dynamo-electric machine will be open when the connections are changed to reverse the polarity. Such operating conditions occur when the dynamo-electric machine is employed for performing arc welding operations. It is, therefore, unnecessary to provide a switch with high arc rupturing capacity. Thus, a switch with substantially no arc rupturing capacity may be interposed directly between the output circuit of the dynamo-electric machine and its load terminals to which the load circuit is connected.

The object of my invention, generally stated, is to provide a reversing switch for a dynamo-electric machine which shall be simple and efficient in operation, and which may be readily and economically manufactured and installed.

The principal object of my invention is to provide for reversing the connections between two pairs of conductors.

An important object of my invention is to provide for reversing the polarity applied by a direct-current generator to its load terminals.

Another important object of my invention is to provide for mounting a reversing switch, interposed in the output circuit of a direct-current generator, inside of the frame of the generator.

Another object of my invention is to provide for mounting a reversing switch inside of the frame of a direct-current generator and for operating the switch from outside of the generator.

A further object of my invention is to provide for mounting a reversing switch for a direct-current generator inside of the generator on terminals of the switch which project through the generator frame.

A still further object of my invention is to provide a reversing switch comprising a pair of interconnected switch members and a common switch member for connection to one pair of conductors and a slide connected to another pair of conductors and disposed to engage either of the interconnected switch members and the common switch member.

Still another object of my invention is to provide a reversing switch comprising a pair of interconnected switch members and a common switch member for connection to one pair of conductors and a slide connected to another pair of conductors and disposed to engage either of the interconnected switch members and the common switch member and for mounting the reversing switch on its terminal members, one being connected to one of the pair of interconnected switch members and the other being connected to the common switch member.

Other objects of my invention will, in part, be obvious and, in part, appear hereinafter.

My invention, accordingly, is disclosed in the embodiment hereof shown in the accompanying drawings, and comprises the features of construction, combination of elements, and arrangement of parts, which will be exemplified in the construction hereinafter set forth and the scope of the application of which will be indicated in the appended claims.

For a more complete understanding of the nature and scope of my invention reference may be had to the following detailed description taken in connection with the accompanying drawings, in which:

Fig. 4 is a view, in side elevation, showing the assembly of the reversing switch;

Fig. 5 is a view, in side elevation, showing the construction of the switch base;

Fig. 6 is a view in end elevation of the switch base shown in Fig. 5;

Fig. 7 is a bottom plan view of the switch base shown in Fig. 5;

Fig. 8 is a view, in side elevation, showing the construction of the slide;

Fig. 9 is a sectional view taken along the line IX—IX of Fig. 8;

Fig. 10 is a sectional view taken along the line X—X of Fig. 8; and

Fig. 11 is a bottom plan view of the slide shown in Fig. 8.

Figure 1:
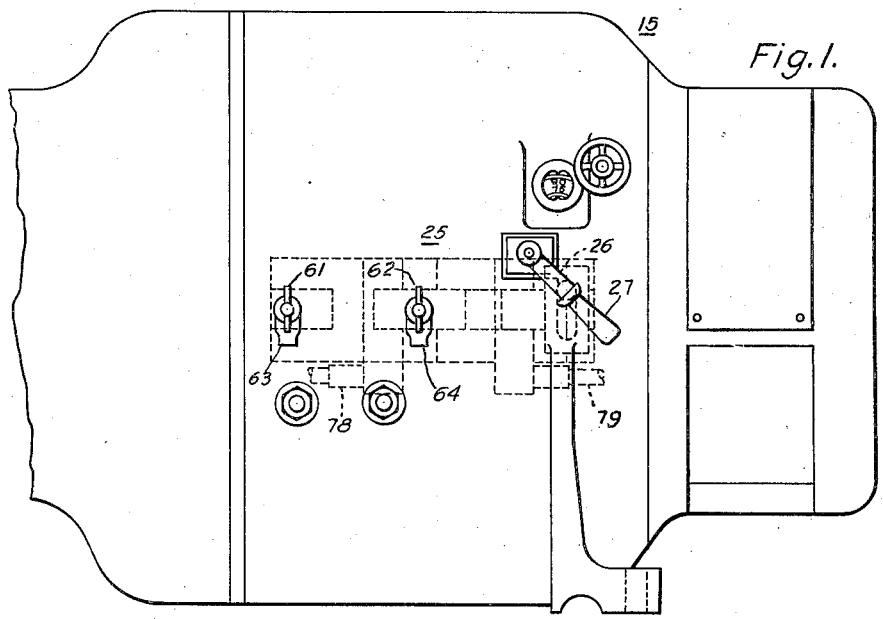
Fig. 1 is a view, in side elevation, showing the generator and a portion of the motor of a motor-generator set in which a switch constructed in accordance with this invention may be incorporated.
Figure 2:
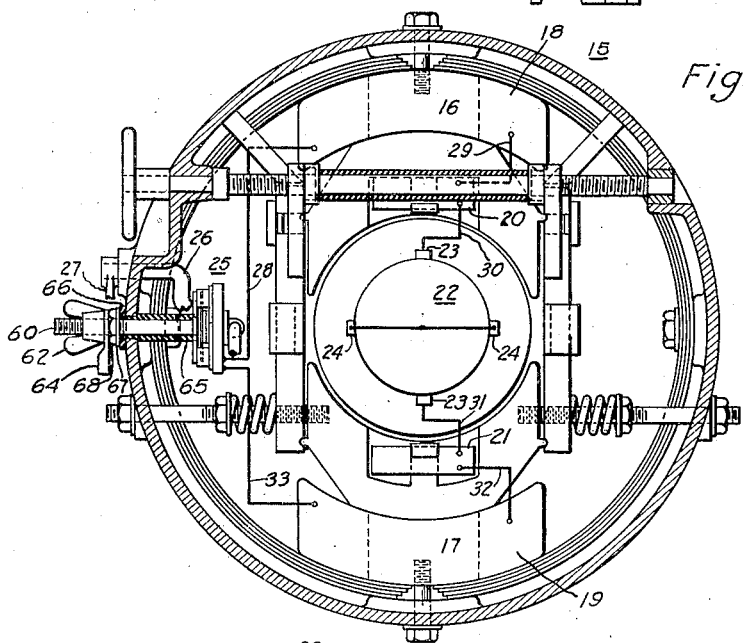
Fig. 2 is a cross-sectional view showing the arrangement of the reversing switch inside of the generator illustrated in Fig. 1.

Referring now particularly to Figs. 1 and 2 of the drawings, the reference character 15 designates, generally, the frame of a generator. The details of construction of the frame 15 are set forth in my copending application Serial No. 26,873, filed of even date herewith, and assigned to the assignee of this application. The detailed construction of the generator is shown in my copending application Serial No. 26,871, also filed of even date herewith, and assigned to the assignee of this application. Since the details of the frame construction and the construction of the generator form no part of this invention, only sufficient reference herein will be made thereto in order to illustrate the application of the reversing switch to the generator.

As illustrated in Fig. 2 of the drawings, the frame 15 is provided with inwardly projecting poles 16 and 17, each of which is respectively provided with a series field winding 18 and 19. Commutating field windings 20 and 21 are also provided. An armature 22 is positioned between the poles 16 and 17 and is provided with main brushes 23—23 and auxiliary brushes 24—24, the latter being short-circuited since the generator illustrated herein is of the cross-field type.

In order to reverse the polarity of the output circuit of the generator, a reversing switch, shown generally at 25, is provided. As illustrated, the reversing switch 25 is mounted inside of the frame 15 and is arranged to be operated by means of a lever 26 which is rotatably mounted in the frame 15 and is provided at its outer end with a handle 27, that may be readily gripped by the operator to change the position of the switch 25, as may be desired.

In order to clearly point out the connections to the reversing switch 25, the output circuit of the generator will be traced in detail as follows, beginning at the reversing switch 25. The circuit extends through the conductor 28, series field winding 18, conductor 29, commutating field winding 20, conductor 30, brush 23, armature 22, brush 23, conductor 31, commutating field winding 21, conductor 32, series field winding 19, and conductor 33 back to the reversing switch 25.

Figure 3:
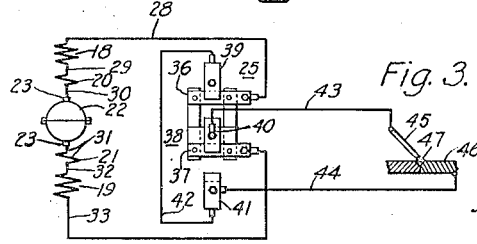
Fig. 3 illustrates diagrammatically the circuit connections between the output circuit of the generator and the load circuit.

As shown in Fig. 3, the conductors 28 and 33, from the output circuit of the generator, are connected to contact bars 36 and 37, respectively, which form a part of a slide shown generally at 38. In the position shown, the contact bars 36 and 37 are disposed to engage an outside switch member 39 and a center or common switch member 40, respectively. The slide 38 may be moved so that the contact bars 36 and 37 engage, respectively, the common switch member 40 and another outer switch member 41. The outer switch members 39 and 41 may be interconnected by means of a conductor 42.

The load circuit comprising conductors 43 and 44 is connected respectively to the common switch member 40 and the outer switch member 41. In effect, due to the interconnecting conductor 42, the conductor 44 is also connected to the other outer switch member 39. The conductors 43 and 44 are connected, respectively, to a welding electrode 45 and work 46 between which an arc 47 may be maintained.

While the output circuit has been illustrated as being connected to the contact bars 36 and 37, and the load circuit as being connected to the switch members 40 and 41, it will be observed that this arrangement of connections may be reversed and that the load circuit may be connected to the contact bars 36 and 37 and the output circuit may be connected to the switch members 40 and 41 as may be desired. However, for purposes which will appear hereinafter, it is preferable to connect the load circuit to the stationary switch members 40 and 41.

Referring now particularly to Figs. 5, 6 and 7 of the drawings, it will be observed that the switch members 39, 40 and 41 are mounted on a rectangular switch base 51 comprising a flat plate of insulating material. Each of the outer switch members 39 and 41 comprises jaws 52 and 53 which may be spaced apart by means of spacers 54. A flat headed bolt 55 is provided for mounting the outer switch member 39 in assembled relation.

The common switch member 40 comprises jaws 56 and 57, which extend oppositely and in the directions of the outer switch members 39 and 41. The jaws 56 and 57 are spaced apart by means of a spacer 58, which comprises a flat bar that also serves as a stop for the movement of the contact bars 36 and 37 of the slide 38.

In order to provide for connection to the load circuit comprising the conductors 43 and 44, terminal studs 59 and 60 are provided individual, respectively, to the outer switch member 41 and the common switch member 40. Wing nuts 61 and 62, respectively, are provided for securing terminals 63 and 64, Fig. 1, in proper contact engagement with the studs 59 and 60.

As is illustrated more clearly in Fig. 2 of the drawings, the switch 25 is arranged to be mounted inside of the frame 15 on its own terminals 59 and 60. It is, therefore, unnecessary to provide additional mounting means for supporting the switch 25. The terminal studs 59 and 60 project through suitable openings in the frame 15 and are insulated therefrom by means of insulating sleeves 65 which surround the terminal studs 59 and 60 and which are provided with reduced sections that project through the frame 15. Additional insulating washers 66 are provided outside of the frame for cooperation with the insulating sleeves 65 to provide for completely insulating the studs 59 and 60 from the frame 15. Metallic washers 67 are provided outside of the insulating washers 66, the assemblies being held in position by means of lock nuts 68. As shown, the terminal 64 may be positioned between the lock nut 68 and the wing nut 62.

As illustrated in Fig. 7 of the drawings, terminals 71 and 72 are provided, respectively, on the outer switch members 41 and 39 for connection by means of the interconnecting conductor 42. It will be understood, however, that a flat copper bar or strap may be provided for interconnecting the outer contact members 39 and 41 instead of the conductor and terminal arrangement as illustrated.

Referring now particularly to Figs. 8 through 11 of the drawings, it will be observed that the slide 38 is there shown in detail. The contact bars 36 and 37 are mounted on insulating spacing strips 75 and 76 by means of flat headed screws 77. Terminals 78 and 79 are provided for the contact bars 37 and 36, respectively, for connection to conductors 33 and 28, respectively, forming the load terminals of the generator.

In order to operate the slide 38, a guide 80 is provided having a slotted opening 81 therein. The inner end of the operating lever 26 is arranged to project into the slotted opening 81 and on rotation thereof, is arranged to move the slide 38 from one position to another. For example, in the arrangement shown in Fig. 4 of the drawings, the slide 38 is so positioned that the contact bars 36 and 37 are in engagement, respectively, with the outer switch member 39 and the common switch member 40. When the slide 38 is moved to the left, the contact bars 36 and 37 will engage, respectively, the common switch member 40 and the outer switch member 41, as is shown by the dot and dash outline of the slider 38 in the left-hand position in Fig. 4. The guide 80 is spaced from the insulating strips 75 and 76 by means of fiber spacers 82 and is secured thereto by means of flat headed screws 83.

It will now be observed that the reversing switch 25 as shown in assembled form in Fig. 4 of the drawings comprises outer switch members 39 having spaced apart jaws 52 and 53 and that the contact bars 36 and 37 of the slide 38 are arranged to engage either of the outer switch members, depending upon the position of the slide. Also depending upon the position of the slide 38, one or the other of the contact bars 36 and 37 will engage the spaced apart jaws 56 and 57 of the common or inner switch member 40. Because of this arrangement, the distance between the center lines of the contact bars 36 and 37 is substantially equal to the distance between either of the center lines of the outer switch members 39 or 41 and the center line of the inner or common switch member 40. With this arrangement, a minimum of parts is required to provide the necessary reversing connections between the conductors 28—33 and the conductors 43—44. Furthermore, in view of the fact that the reversing switch 25 is mounted on the studs 59 and 60, which form the output terminals of the generator, the design is simplified and the expense of construction is reduced.

Since certain further changes may be made in the foregoing construction and different embodiments of the invention may be made without departing from the scope thereof, it is intended that all matter shown in the accompanying drawings, or set forth in the above description shall be interpreted as illustrative and not in a limiting sense.

I claim as my invention:

1. In combination, a dynamo-electric machine having a frame structure, terminal connections for the machine projecting through said frame, and a reversing switch mounted inside of said frame upon the terminal connections and operable to reverse the polarity of said terminal connections.

2. In a dynamo-electric machine, in combination, a frame for the machine, field and armature structure disposed within said frame, a pair of terminal connections for said structure, an output circuit comprising field and armature windings associated with said structure, a heavy duty reversing switch mounted inside of said frame and disposed between the output circuit of the field and armature structure and the terminal connections to reverse the polarity applied to said terminal connections, and operating means mounted outside of and extending through said frame for operating said reversing switch.

3. In a dynamo-electric machine, in combination, a frame for the machine, a direct-current generating structure disposed within said frame, an output circuit comprising field and armature windings associated with said structure, a pair of terminal connections connected to the output circuit of said structure, and a reversing switch mounted inside of said frame and interposed in said output circuit for reversing the polarity applied to said terminal connections, without altering the polarity of the output circuit.

4. In a dynamo-electric machine, in combination, a frame for the machine, a direct-current generating structure disposed within said frame, a pair of terminal connections connected to the output circuit of said structure, a reversing switch mounted inside of said frame and interposed in said output circuit for reversing the polarity applied to said terminal connections without altering connections within the output circuit, and operating means mounted outside of and extending through said frame for operating said reversing switch.

5. In a dynamo-electric machine, in combination, a frame for the machine, a direct-current generating structure disposed within said frame, an output circuit associated with said structure, a reversing switch having a pair of load terminals, said reversing switch being mounted inside of said frame on said terminals and connected to the output circuit of said generating structure for reversing the polarity applied to said terminals without affecting the polarity of the output circuit, and operating means mounted outside of and extending through said frame for operating said reversing switch.

6. In a dynamo-electric machine, in combination, a frame for the machine, a direct-current generating structure disposed within said frame, a reversing switch having a pair of load terminals, said load terminals being extended through and insulated from said frame to support said reversing switch inside of said frame, said reversing switch being connected to the output circuit of said generating structure for reversing the polarity applied to said terminals by the output circuit, and operating means extending through said frame for operating said reversing switch.

7. In a dynamo-electric machine, in combination, a frame for the machine, a direct-current generating structure disposed within said frame, a pair of load terminals extending through and insulated from said frame, and a heavy duty reversing switch mounted on said terminals and connected to the output circuit of said generating structure for reversing the polarity applied to said terminals by the output circuit.

8. In a dynamo-electric machine, in combination, a frame for the machine, a direct-current generating structure disposed within said frame, an output circuit associated with said structure, a pair of load terminals extending through and insulated from said frame, a reversing switch mounted on said terminals and connected to the output circuit of said generating structure for reversing the polarity applied to said terminals without altering the polarity of the output circuit, and operating means mounted outside of and extending through said frame for operating said reversing switch.

JOHN H. BLANKENBUEHLER.